United States Patent [19]
Drouin et al.

[11] Patent Number: 6,104,568
[45] Date of Patent: Aug. 15, 2000

[54] SERVO-BURST GRAY CODE PATTERN

[75] Inventors: David Drouin, Milpitas; Vien N. Nguyen; Stephen R. Jackson, both of San Jose, all of Calif.

[73] Assignee: Castlewod Systems, Inc., Pleasanton, Calif.

[21] Appl. No.: 08/970,881

[22] Filed: Nov. 14, 1997

[51] Int. Cl.[7] ............................. G11B 5/596; G11B 5/09
[52] U.S. Cl. ........................ 360/78.04; 360/48; 360/49
[58] Field of Search .......................... 360/48, 49, 77.08, 360/78.14, 78.04

[56] References Cited

U.S. PATENT DOCUMENTS

| | | | |
|---|---|---|---|
| 5,235,478 | 8/1993 | Hoshimi et al. | 360/77.08 |
| 5,257,149 | 10/1993 | Meyer | 360/78.14 |
| 5,398,141 | 3/1995 | Tannert | 360/133 |
| 5,523,903 | 6/1996 | Hetzler et al. | 360/77.08 |
| 5,535,072 | 7/1996 | Witt et al. | 360/99.06 |
| 5,559,648 | 9/1996 | Hunter et al. | 360/75 |
| 5,570,244 | 10/1996 | Wiselogel | 360/60 |
| 5,579,189 | 11/1996 | Morehouse et al. | 360/105 |
| 5,587,850 | 12/1996 | Ton-that | 360/77.08 |
| 5,589,998 | 12/1996 | Yu | 360/77.08 |
| 5,615,063 | 3/1997 | Kuroki et al. | 360/66 |
| 5,636,075 | 6/1997 | Nishimura et al. | 360/48 |
| 5,771,126 | 6/1998 | Choi | 360/78.14 |
| 5,777,813 | 7/1998 | Sun et al. | 360/66 |

*Primary Examiner*—W. Chris Kim
*Attorney, Agent, or Firm*—Townsend and Townsend and Crew LLP

[57] ABSTRACT

A technique for determining a position of a read/write head relative to a magnetic disk includes the steps of providing the magnetic disk having a plurality of odd servo sectors and a plurality of even servo sectors, reading a first gray code pattern in an odd servo sector from the plurality of odd servo sectors on the magnetic disk, reading a second gray code pattern in an even servo sector from the plurality of even servo sectors on the magnetic disk, the even servo sector adjacent to the odd servo sector on the magnetic disk and determining the position of the read/write head only in response to the first gray code pattern and the second gray code pattern.

20 Claims, 10 Drawing Sheets

SERVO-BURST GRAY CODE PATTERN

BACKGROUND OF THE INVENTION

The present invention generally relates to removable storage devices for electronic information. More particular, The present invention relates to enhancing data storage capacity by reducing the amount of information stored within servo sectors of a magneto resistive (MR) disk.

Consumer electronics including television sets, personal computers, and stereo or audio systems, have changed dramatically since their availability. Television was originally used as a stand alone unit in the early 1900's, but has now been integrated with audio equipment to provide video with high quality sound in stereo. For instance, a television set can have a high quality display coupled to an audio system with stereo or even "surround sound" or the like. This integration of television and audio equipment provides a user with a high quality video display for an action movie such as STARWARS™ with "life-like" sound from the high quality stereo or surround sound system. Accordingly, the clash between Luke Skywalker and Darth Vader can now be seen as well as heard in surround sound on your own home entertainment center. In the mid- 1990's, computer-like functions became available on a conventional television set. Companies such as WebTV of California provide what is commonly termed as "Internet" access to a television set. The Internet is a world wide network of computers, which can now be accessed through a conventional television set at a user location. Numerous displays or "wet sites" exist on the Internet for viewing and even ordering goods and services at the convenience of home, where the act of indexing through websites is known as "surfing" the web. Accordingly, users of WebTV can surf the Internet or web using a home entertainment center.

As merely an example, FIG. 1 illustrates a conventional audio and video configuration, commonly termed a home entertainment system, which can have Internet access. FIG. 1 is generally a typical home entertainment system, which includes a video display 10 (e.g., television set), an audio output 20, an audio processor 30, a video display processor 40, and a plurality of audio or video data sources 50. Consumers have often been eager to store and play back pre-recorded audio (e.g., songs, music) or video using a home entertainment system. Most recently, consumers would like to also store and retrieve information, commonly termed computer data, downloaded from the Internet.

Music or audio have been traditionally recorded on many types of systems using different types of media to provide audio signals to home entertainment systems. For example, these audio systems include a reel to reel system 140, using magnetic recording tape, an eight track player 120, which uses eight track tapes, a phonograph 130, which uses LP vinyl records, and an audio cassette recorder 110, which relies upon audio cassettes. Optical storage media also have been recognized as providing convenient and high quality audio play-back of music, for example. Optical storage media exclusively for sound include a digital audio tape 90 and a compact disk 10. Unfortunately, these audio systems generally do not have enough memory or capacity to store both video and audio to store movies or the like. Tapes also have not generally been used to efficiently store and retrieve information from a personal computer since tapes are extremely slow and cumbersome.

Audio and video have been recorded together for movies using a video tape or video cassette recorder, which relies upon tapes stored on cassettes. Video cassettes can be found at the local Blockbuster™ store, which often have numerous different movies to be viewed and enjoyed by the user. Unfortunately, these tapes are often too slow and clumsy to store and easily retrieve computer information from a personal computer. Additional video and audio media include a laser disk 70 and a digital video disk 60, which also suffer from being read only, and cannot be easily used to record a video at the user site. Furthermore, standards for a digital video disk have not been established of the filing date of this patent application and do not seem to be readily establishable in the future.

From the above, it is desirable to have a storage media that can be used for all types of information such as audio, video, and digital data, which have features such as a high storage capacity, expandability, and quick access capabilities.

Skewing between read/write heads of disk drives and data tracks on a magnetic disk is a significant problem with magneto resistive (MR) disk drives. Magneto resistive (MR) disk drive mechanisms differ from conventional magnetic disk drive mechanisms by incorporating separate read heads and write heads. With conventional magnetic disk drive mechanisms the read head is also used for the write head, thus the track being read can also be written to. Because the read heads and write heads in a MR disk drive mechanisms are separated by a distance, as the heads track across an MR disk, the orientation of the heads relative to tracks on the MR disk are skewed.

The present invention relates to storage media that utilizes magneto-resistive head (MR read/write head) technology. One benefit to MR head technology is the reduction in amount of data overhead by removing ID fields from data sectors on the disk. Magnetic disks without such ID fields are termed "headerless ID" magnetic disks.

One embodiment is found in the following article "No-ID Sector Format" found at the following web site: http://www.almaden.ibm.com/storage/oem/tch/noid.htm. This article is incorporated by reference for all purposes.

Removing ID fields increases the amount of track space one can dedicate for data, however, further reduction of servo section size is still desired. Gray code patterns within servo sectors typically include a cylinder (or track number) and sector data identifying the location within a particular track.

What is required is a method and apparatus for increasing the amount of information stored within a headerless ID scheme.

SUMMARY OF THE INVENTION

According to the present invention, a technique including methods and a device for providing a single type of media for electronic storage applications is provided. In an exemplary embodiment, the present invention provides a methods and apparatus for increasing storage capacity of removable media.

According to an embodiment, a method for determining a position of a read/write head relative to a magnetic disk, the method includes the steps of providing the magnetic disk having a plurality of odd servo sectors and a plurality of even servo sectors, reading a first gray code pattern in an odd servo sector from the plurality of odd servo sectors on the magnetic disk, and reading a second gray code pattern in an even servo sector from the plurality of even servo sectors on the magnetic disk, the even servo sector adjacent to the odd servo sector on the magnetic disk. The position of the read/write head is determinable in response to the first gray code pattern and the second gray code pattern.

Numerous benefits are achieved by way of the present invention. For instance, the present invention reduces the amount of data required for read/write head positioning data on a removable magnetic disk. Depending upon the embodiment, the present invention provides at least one of these if not all of these benefits and others, which are further described throughout the present specification.

Further understanding of the nature and advantages of the invention may be realized by reference to the remaining portions of the specification and drawings.

DESCRIPTION OF SPECIFIC EMBODIMENTS

System Overview

Figure 1:
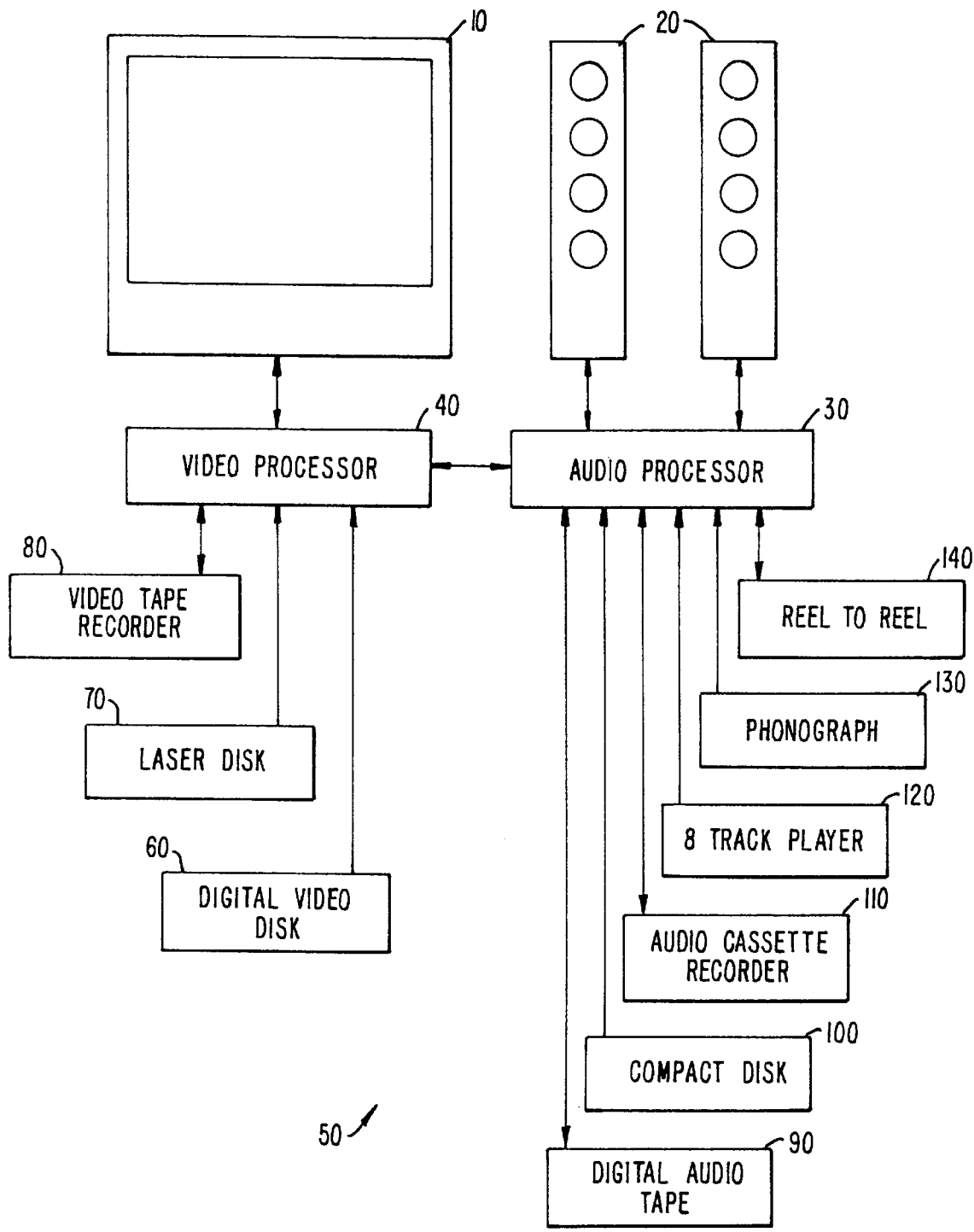
FIG. 1 illustrates a conventional audio and video configuration.
Figure 2:
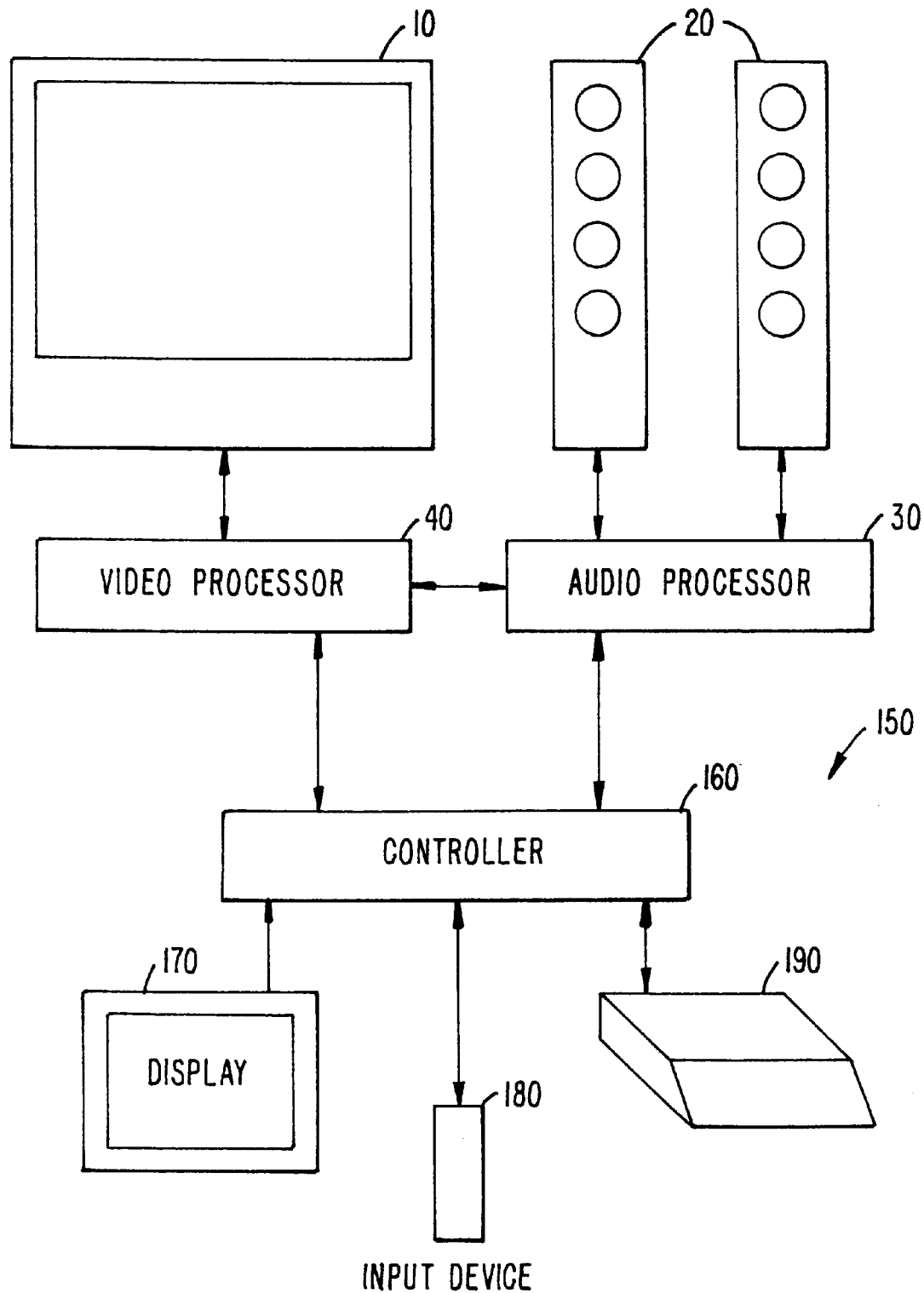
FIG. 2 illustrates a system according to an embodiment of the present invention.

FIG. 2 is a simplified block diagram of a system according to an embodiment of the present invention. This embodiment is merely an illustration and should not limit the scope of the claims herein. The system 150 includes the television display 10, which is capable of Internet access or the like, the audio output 20, a controller 160, a user input device 180, a novel storage unit 190 for storing and accessing data, and optionally a computer display 170. Output from system 150 is often audio and/or video data and/or data that is generally input into audio processor 30 and/or video processor 40.

Figure 5A:
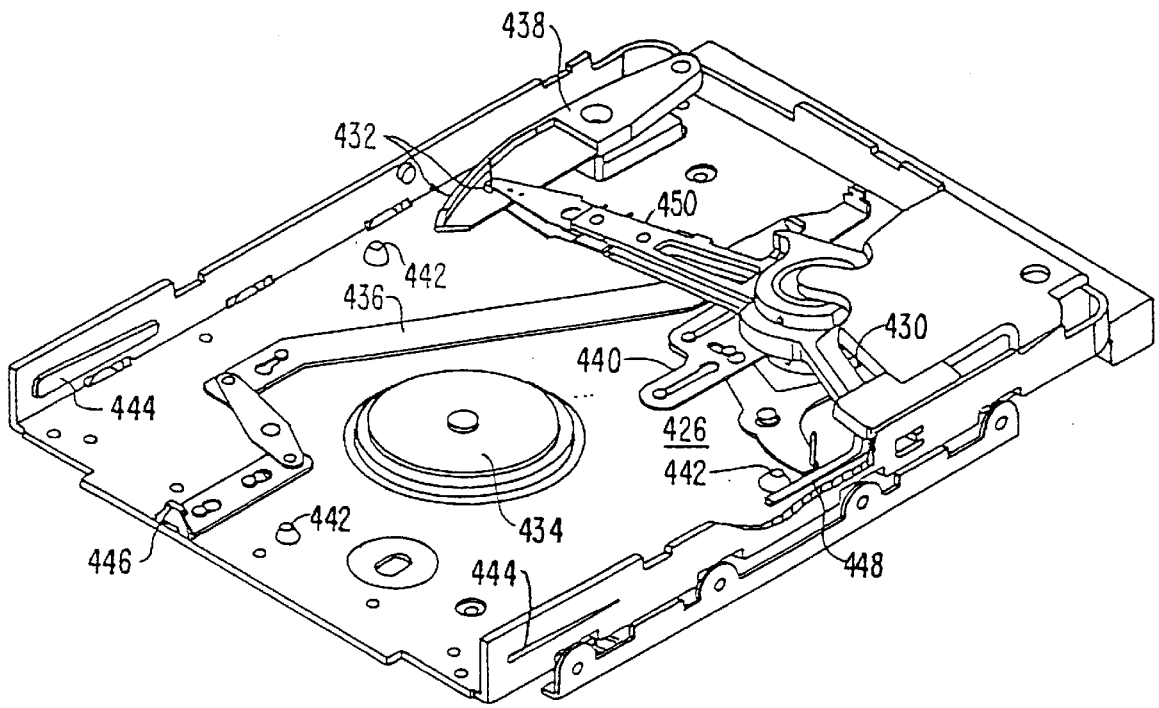
FIGS. 5A–5F illustrate simplified views and a storage unit for reading and/or writing from a removable media cartridge.
Figure 5B:
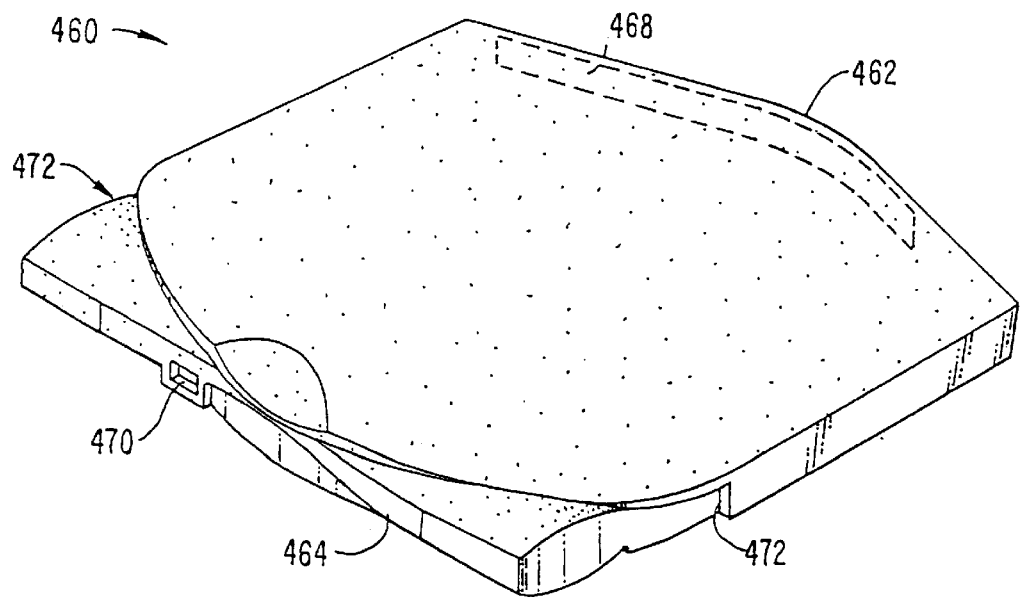
Figure 5C:
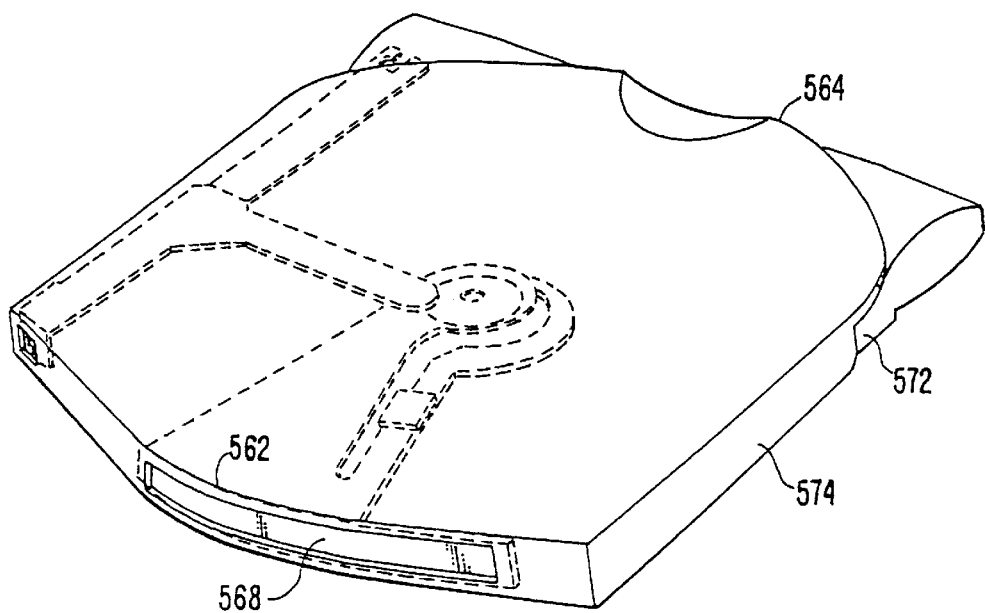

The storage unit includes a high capacity removable media cartridge, such as the one shown in FIGS. 5B & 5C, for example. The removable media cartridge can be used to record and playback information from a video, audio, or computer source. The cartridge is capable of storing at least 2 GB of data or information. The cartridge also has an efficient or fast access time of about 13 ms and less, which is quite useful in storing data for a computer. The cartridge is removable and storable. For example, the cartridge can store up to about 18 songs, which average about 4 minutes in length. Additionally, the cartridge can store at least 0.5 for MPEGII–2 for MPEGI full length movies, which each runs about 2 hours. Furthermore, the cartridge can be easily removed and stored to archive numerous songs, movies, or data from the Internet or the like. Accordingly, the high capacity removable media provides a single unit to store information from the video, audio, or computer. Further details of the storage unit are provided below.

Figure 3:
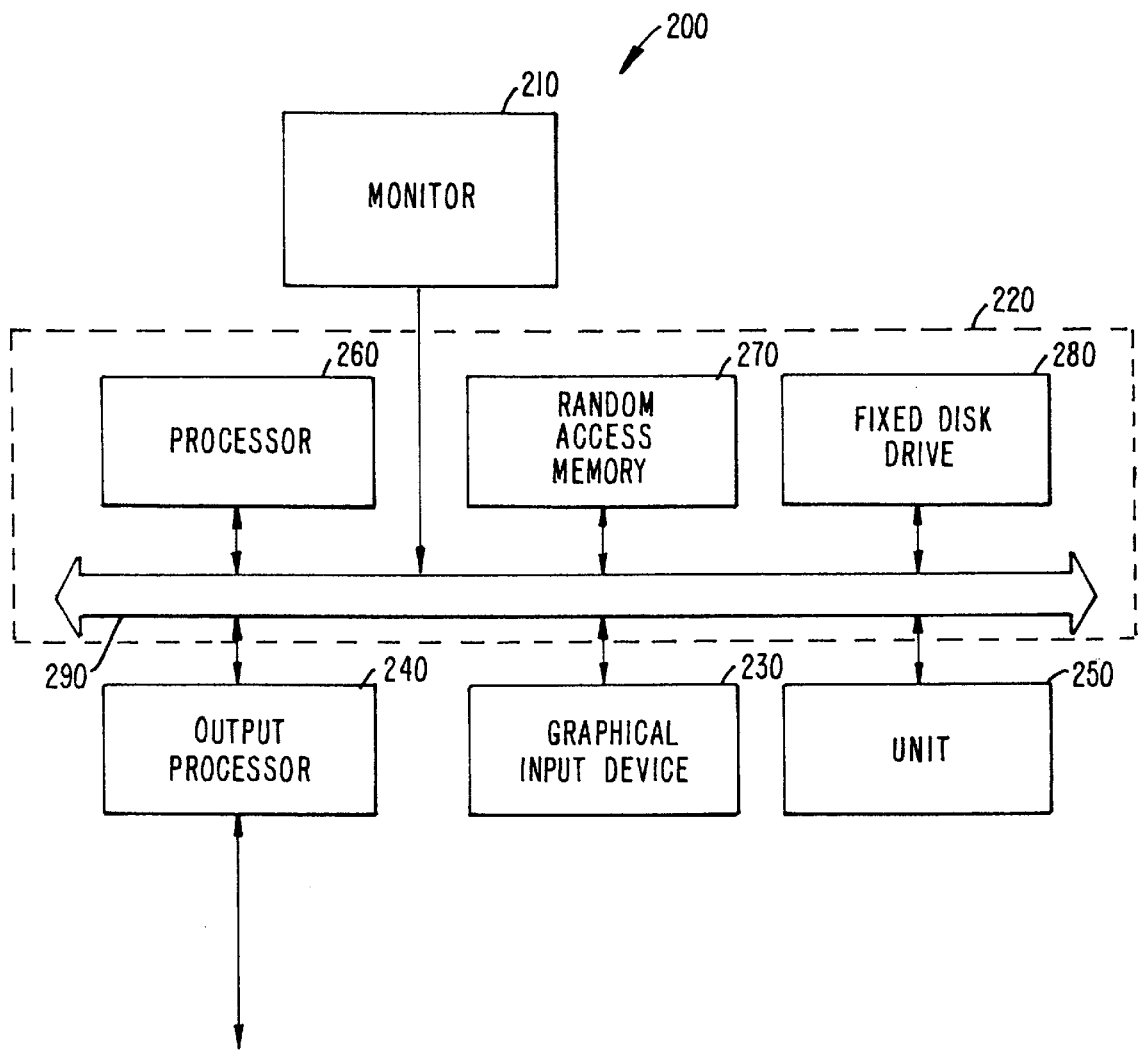
FIG. 3 includes a detailed block diagram of a system 200 according to an embodiment of the present invention.

In an alternative embodiment, FIG. 3 is a simplified block diagram of an audio/video/computer system 200. This diagram is merely an illustration and should not limit the scope of the claims herein. The system 200 includes a monitor 210, a controller 220, a user input device 230, an output processor 240, and a novel electronic storage unit 250 preferably for reading and writing from a removable media source, such as a cartridge. Controller 220 preferably includes familiar controller components such as a processor 260, and memory storage devices, such as a random access memory (RAM) 270, a fixed disk drive 280, and a system bus 290 interconnecting the above components.

User input device 230 may include a mouse, a keyboard, a joystick, a digitizing tablet, a wireless controller, or other graphical input devices, and the like. RAM 270 and fixed disk drive 280 are mere examples of tangible media for storage of computer programs and audio and/or video data, other types of tangible media include floppy disks, optical storage media such as CD-ROMs and bar codes, semiconductor memories such as flash memories, read-only-memories (ROMs), ASICs, battery-backed volatile memories, and the like. In a preferred embodiment, controller 220 includes a '586 class microprocessor running Windows98™ operating system from Microsoft Corporation of Redmond, Wash. Of course, other operating systems can also be used depending upon the application.

The systems above are merely examples of configurations, which can be used to embody the present invention. It will be readily apparent to one of ordinary skill in the art that many system types, configurations, and combinations of the above devices are suitable for use in light of the present disclosure. For example, in alternative embodiments of FIG. 2, for example, video display 10 is coupled to controller 220 thus a separate monitor 210 is not required. Further, user input device 230 also utilizes video display 10 for graphical feedback and selection of options. In yet other embodiments controller 220 is integrated directly into either audio processor 20 or video processor 30, thus separate output processor 240 is not needed. In another embodiment, controller 220 is integrated directly into video display 10. Of course, the types of system elements used depend highly upon the application.

Detailed Description

Figure 4A:
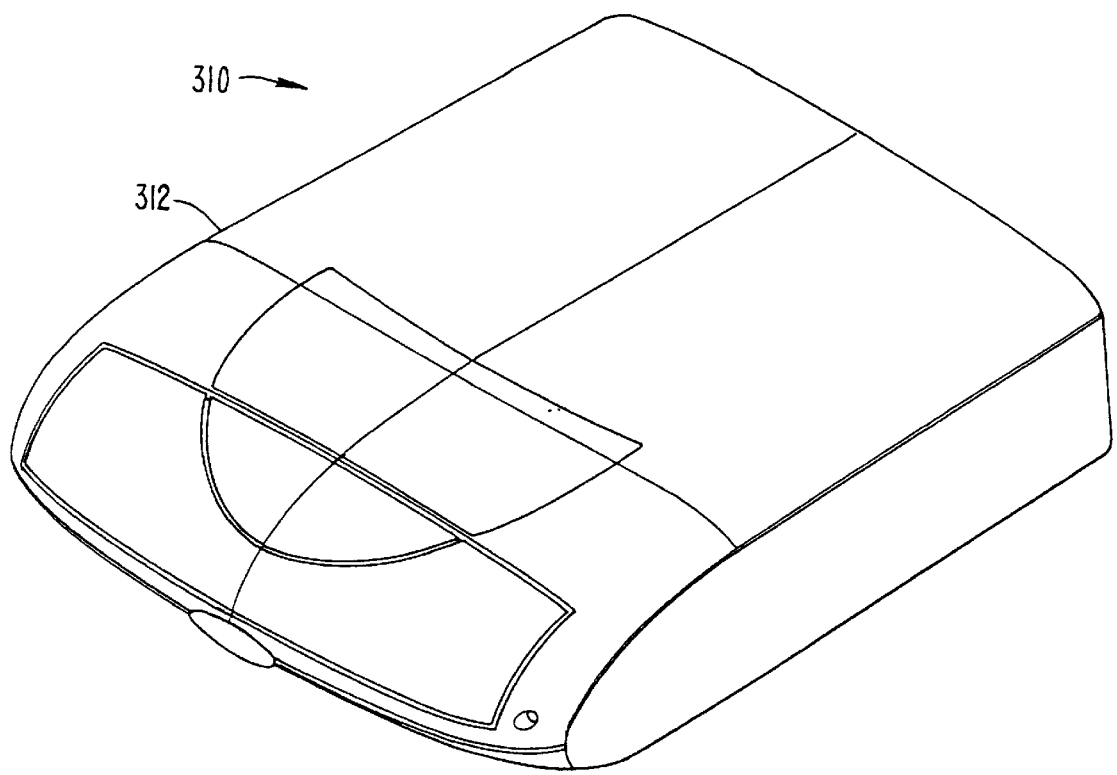
FIGS. 4A and 4B illustrate a storage unit according to an embodiment of the present invention.
Figure 4B:
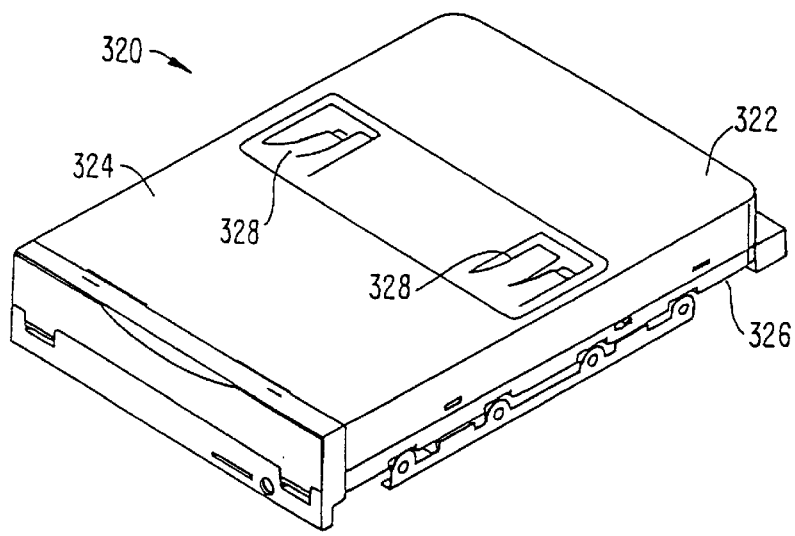

Referring now to FIGS. 4A and 4B, a storage unit according to the present invention can be an external disk drive 310 or internal disk drive 320 unit, which shares many of the same components. However, external drive 310 will include an enclosure 312 adapted for use outside a personal computer, television, or some other data manipulation or display device. Additionally, external drive 310 will include standard I/O connectors, parallel ports, and/or power plugs similar to those of known computer peripheral or video devices.

Internal drive 320 will typically be adapted for insertion into a standard bay of a computer. In some embodiments, internal drive 310 may instead be used within a bay in a television set such as HDTV, thereby providing an integral video system. Internal drive 320 may optionally be adapted for use with a bay having a form factor of 3 inches, 2.5 inches, 1.8 inches, 1 inch, or with any other generally recognized or proprietary bay. Regardless, internal drive 320 will typically have a housing 322 which includes a housing cover 324 and a base plate 326. As illustrated in FIG. 4B, housing 324 will typically include integral springs 328 to bias the cartridge downward within the receiver of housing 322. It should be understood that while external drive 310 may be very different in appearance than internal drive 320, the external drive will preferably make use of base plate 326, cover 324, and most or all mechanical, electromechanical, and electronic components of internal drive 320.

Many of the components of internal drive 320 are visible when cover 322 has been removed, as illustrated in FIG. 5A.

In this exemplary embodiment, an actuator 450 having a voice coil motor 430 positions first and second heads 432 along opposed recording surfaces of the hard disk while the disk is spun by spindle drive motor 434. A release linkage 436 is mechanically coupled to voice coil motor 430, so that the voice coil motor effects release of the cartridge from housing 422 when heads 432 move to a release position on a head load ramp 438. Head load ramp 438 is preferably adjustable in height above base plate 426, to facilitate aligning the head load ramp with the rotating disk.

A head retract linkage 440 helps to ensure that heads 432 are retracted from the receptacle and onto head load ramp 438 when the cartridge is removed from housing 422. Head retract linkage 440 may also be used as an inner crash stop to mechanically limit travel of heads 432 toward the hub of the disk.

Base 426 preferably comprise a stainless steel sheet metal structure in which the shape of the base is primarily defined by stamping, the shape ideally being substantially fully defined by the stamping process. Bosses 442 are stamped into base 426 to engage and accurately position lower surfaces of the cartridge housing. To help ensure accurate centering of the cartridge onto spindle drive 434, rails 444 maintain the cartridge above the associated drive spindle until the cartridge is substantially aligned axially above the spindle drive, whereupon the cartridge descends under the influence of cover springs 428 and the downward force imparted by the user. This brings the hub of the disk down substantially normal to the disk into engagement with spindle drive 434. A latch 446 of release linkage 436 engages a detent of the cartridge to restrain the cartridge, and to maintain the orientation of the cartridge within housing 422.

A cartridge for use with internal drive 320 is illustrated in FIGS. 5B and 5C. Generally, cartridge 460 includes a front edge 462 and rear edge 464. A disk 666 (see FIG. 5F) is disposed within cartridge 460, and access to the disk is provided through a door 568. A detent 470 along rear edge 464 of cartridge 460 mates with latch 446 to restrain the cartridge within the receptacle of the drive, while rear side indentations 472 are sized to accommodate side rails 444 to allow cartridge 460 to drop vertically into the receptacle.

Figure 5D:
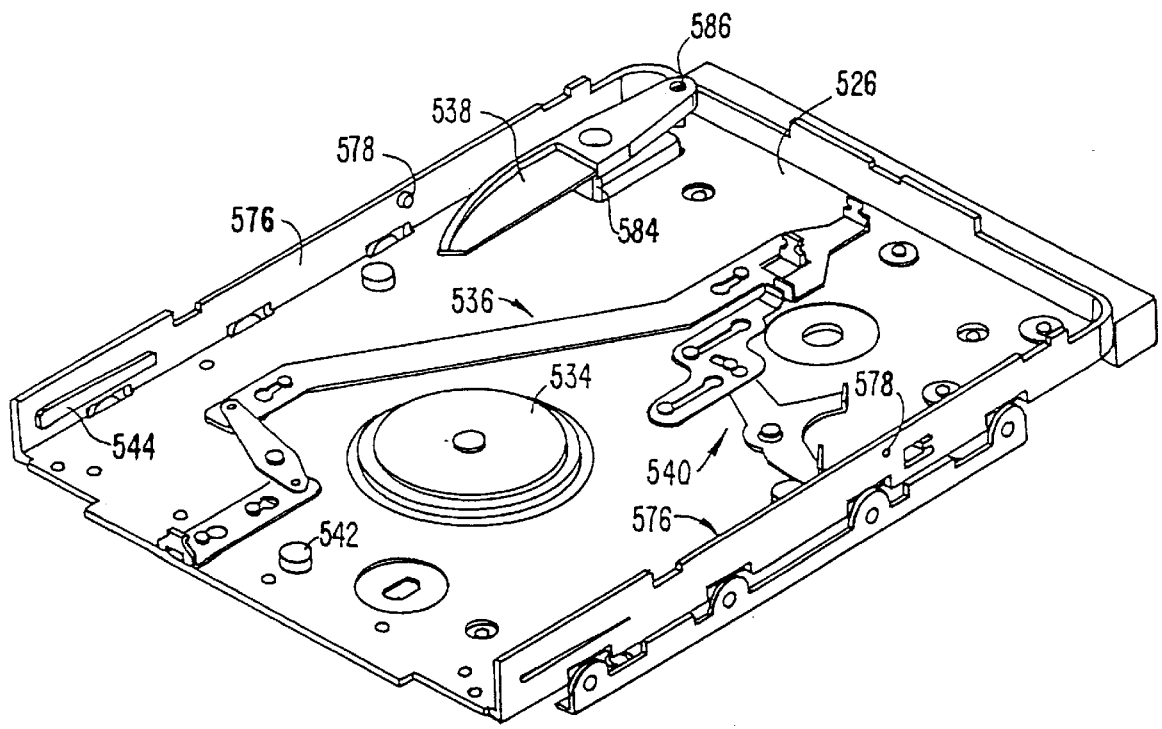
Figure 5E:
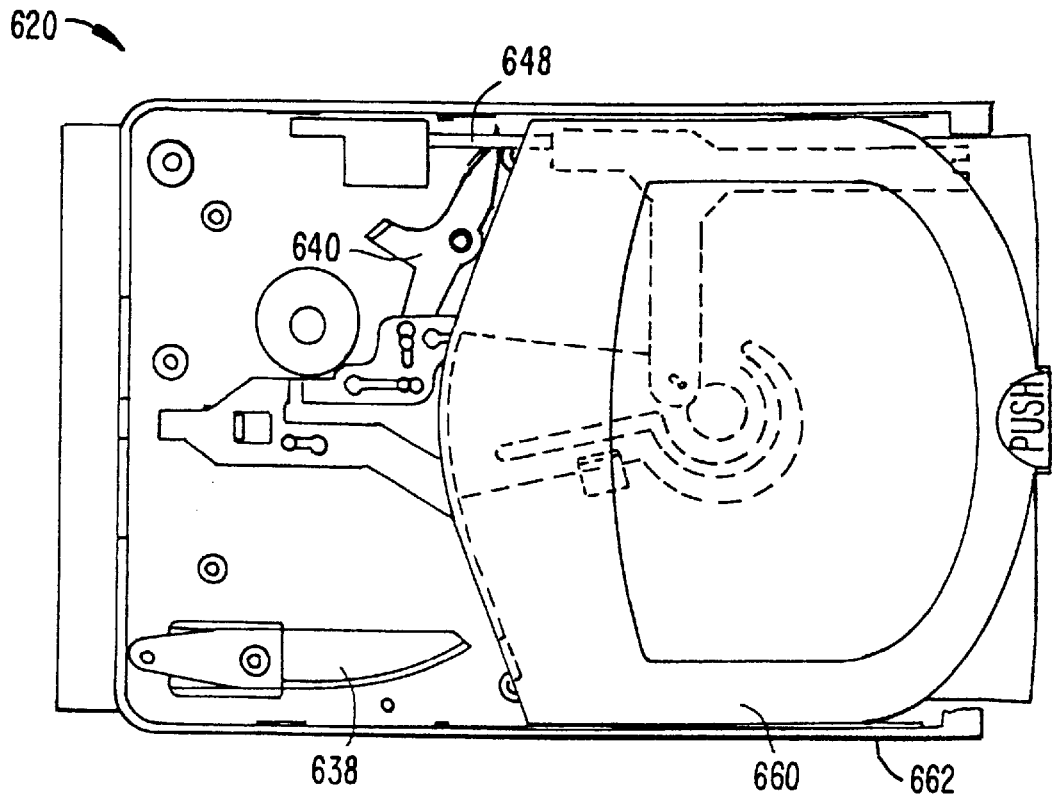

Side edges 574 of cartridge 460 are fittingly received between side walls 576 of base 526, as illustrated in FIG. 5D. This generally helps maintain the lateral position of cartridge 460 within base 426 throughout the insertion process. Stops 578 in sidewall 576 stop forward motion of the cartridge once the hub of disk 666 is aligned with spindle drive 534, at which point rails 444 are also aligned with rear indents 472. Hence, the cartridge drops roughly vertically from that position, which helps accurately mate the hub of the disk with the spindle drive.

Figure 5F:
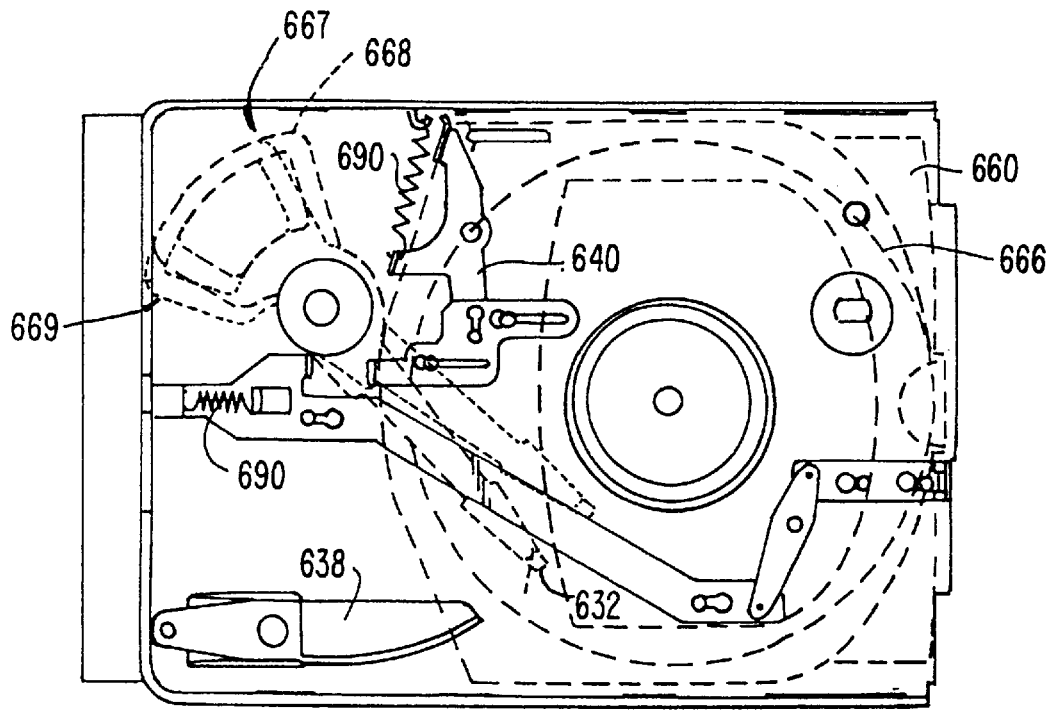

FIG. 5F also illustrates a typical first position 667 of VCM 668 and a typical second position 669 in response to different magnetic fluxes from a motor driver. As a result, read/write heads 632 are repositioned relative to disk 666 as shown.

Figure 6:
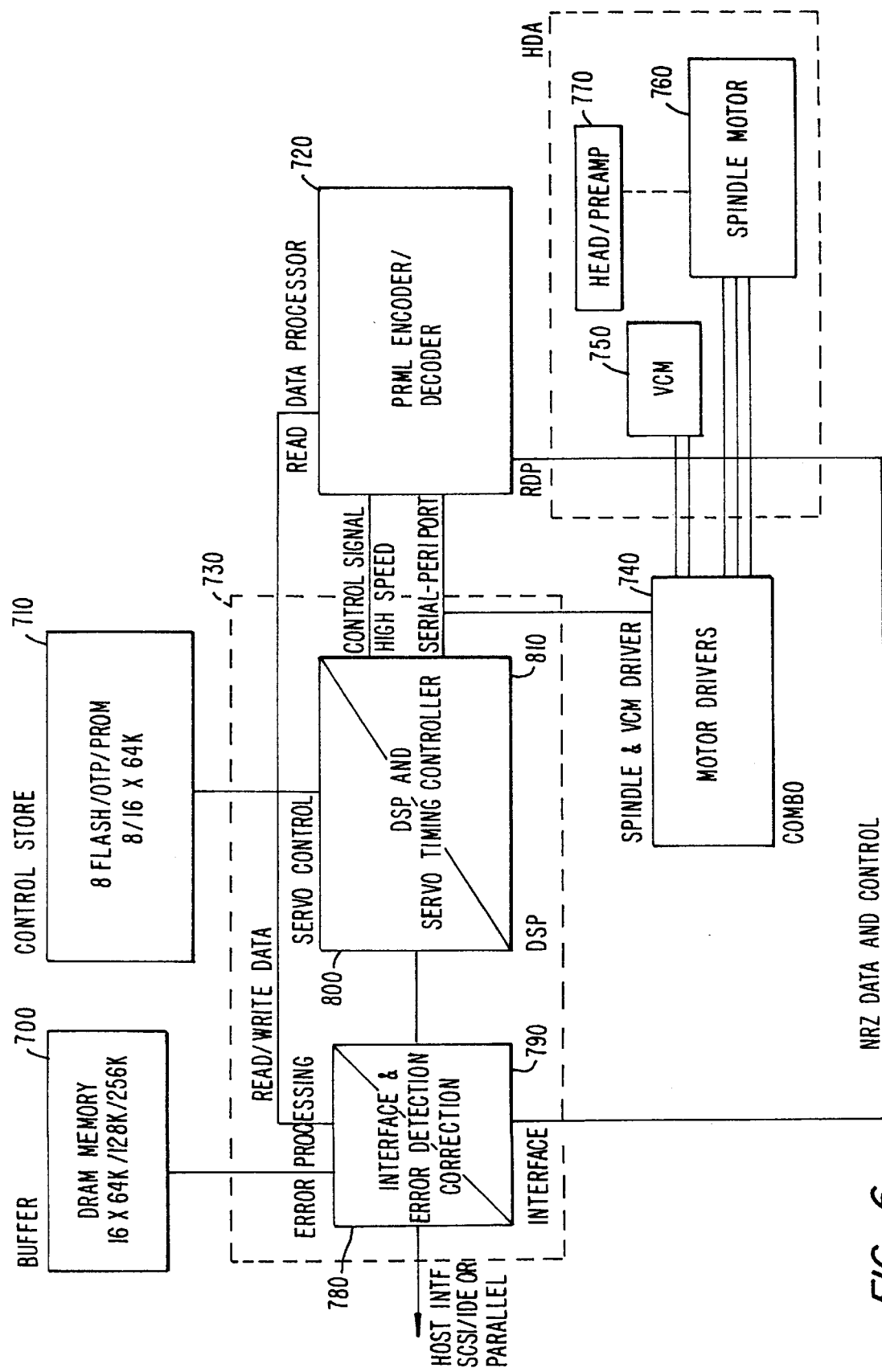
FIG. 6 illustrates a functional block diagram of an embodiment of the present invention.

FIG. 6 illustrates a simplified functional block diagram of an embodiment of the present invention. FIG. 6 includes a buffer 700, a control store 710, a read data processor 720, a controller 730, motor drivers 740, a voice coil motor 750, a spindle motor 760, and read/write heads 770. Controller 730 includes interface module 780, an error detection and correction module 790, a digital signal processor 800, and a servo timing controller 810. Voice coil motor 750 preferably corresponds to voice coil motor 430 in FIG. 5A, spindle motor 760 preferably corresponds to spindle drive motor 434 in FIG. 5A, and read/write heads 770 preferably correspond to read/write heads 432 on actuator arm 450 in FIG. 5A.

As illustrated in FIG. 6, buffer 700 typically comprises a conventional DRAM, having 16 bits × 64 K, 128 K, or 256 K, although other sized buffers are also envisioned. Buffer 700 is typically coupled to error detection and correction module 790. Buffer 700 preferably serves as a storage of data related to a specific removable media cartridge. For example, buffer 700 preferably stores data retrieved from a specific removable media cartridge (typically a magnetic disk), such as media composition and storage characteristics, the location of corrupted locations, the data sector eccentricity of the media, the non-uniformity of the media, the read and write head offset angles for different data sectors of the media and the like. Buffer 700 also preferably stores data necessary to compensate for the specific characteristics of each removable media cartridge, as described above. Buffer 700 typically is embodied as a 1 Meg DRAM from Sanyo, although other vendors' DRAMs may also be used. Other memory types such as SRAM and flash RAM are contemplated in alternative embodiments. Further, other sizes of memory are also contemplated.

Control store 710 typically comprises a readable memory such as a flash RAM, EEPROM, or other types of nonvolatile programmable memory. As illustrated, typically control store 710 comprises a 8 to 16 bit × 64 K memory array, preferably a flash RAM by Atmel. Control store 710 is coupled to DSP 800 and servo timing controller 810, and typically serves to store programs and other instructions for DSP 800 and servo timing controller 810. Preferably, control store 710 stores access information that enables retrial of the above information from the media and calibration data.

Read data processor 720 typically comprises a Partial Read/Maximum Likelihood (PRML) encoder/ decoder. PRML read channel technology is well known, and read data processor 720 is typically embodied as a 81M3010 chip from MARVELL company. Other read data processors, for example from Lucent Technologies are contemplated in alternative embodiments of the present invention. As illustrated, read data processor 720 is coupled to error detection and correction module 790 to provide ECC and data transport functionality.

Interface module 780 typically provides an interface to controller 220, for example. Interfaces include a small computer standard interface (SCSI), an IDE interface, parallel interface, PCI interface or any other known or custom interface. Interface module 780 is typically embodied as an AK-8381 chip from Adaptec, Inc. Interface module 780 is coupled to error detection and correction module 790 for transferring data to and from the host system.

Error detection and correction module 790 is typically embodied as a AIC-8381B chip from Adaptec, Incorporated. This module is coupled by a read/write data line to read data processor 720 for receiving read data and for ECC. This module is also coupled to read data processor 720 by a now return to zero (NRZ) data and control now return to zero line. Other vendor sources of such functionality are contemplated in alternative embodiments of the present invention.

DSP 800 typically provides high-level control of the other modules in FIG. 6. DSP 800 is typically embodied as a AIC-4421A DSP from Adaptec, Inc. As shown, DSP 800 is coupled to read data processor 720 to provide control signals for decoding signals read from a magnetic disk. Further, DSP 800 is coupled to servo timing controller 810 for controlling VCM 750 and spindle motor 760. Other digital signal processors can be used in alternative embodiments, such as DSPs from TI or Motorola.

Servo timing controller 810 is typically coupled by a serial peripheral port to read data processor 720 and to motor drivers 740. Servo timing controller 810 typically controls motor drivers 740 according to servo timing data read from the removable media. Servo timing controller 810 is typically embodied in a portion of DSP800.

Motor driver 740 is typically embodied as a L6260L Chip from SGS-Thomson. Motor driver 740 provides signals to voice coil motor 750 and to spindle motor 760 in order to control the reading and writing of data to the removable media.

Spindle motor 760 is typically embodied as an 8 pole Motor from Sankyo Company. Spindle motor 760 typically is coupled to a center hub of the removable media as illustrated in FIG. 4 and rotates the removable media typically at rates from 4500 to 7200 revolutions per minute. Other manufacturers of spindle motor 760 and other rates of revolution are included in alternative embodiments.

VCM 750 is a conventionally formed voice coil motor. Typically VCM 750 includes a pair of parallel permanent magnets, providing a constant magnetic flux. VCM 750 also includes an actuator having a voice coil, and read/write heads. Read/write heads are typically positioned near the end of the actuator arm, as illustrated in FIG. 5A. The voice coil is typically electrically coupled to motor driver 740. VCM 750 is positioned relative to the magnetic disk in response to the amount of magnetic flux flowing through the voice coil. FIG. 5F illustrates a typical first position 667 of VCM 668 and a typical second position 669 in response to different magnetic fluxes from motor driver 740. As a result, read/write heads 632 are repositioned relative to disk 666 as shown.

In a preferred embodiment of the present invention read/write heads are separate heads that utilize magneto resistive technology. In particular, the MR read/write heads. Typically a preamplifier circuit is coupled to the read/write heads.

In the preferred embodiment of the present embodiment the removable media cartridge is comprises as a removable magnetic disk. When reading or writing data upon the magnetic disk the read/write heads on the end of the actuator arm "fly" above the surface of the magnetic disk. Specifically, because the magnetic disk rotates at a high rate of speed, typically 5400 rpm, a negative pressure pulls the read/write heads towards the magnetic disk, until the read/write heads are typically 0.001 millimeters above the magnetic disk. At 2000 rpm, the negative pressure on the read/write heads drops to approximately half the force as at 5400 rpm.

Figure 7:
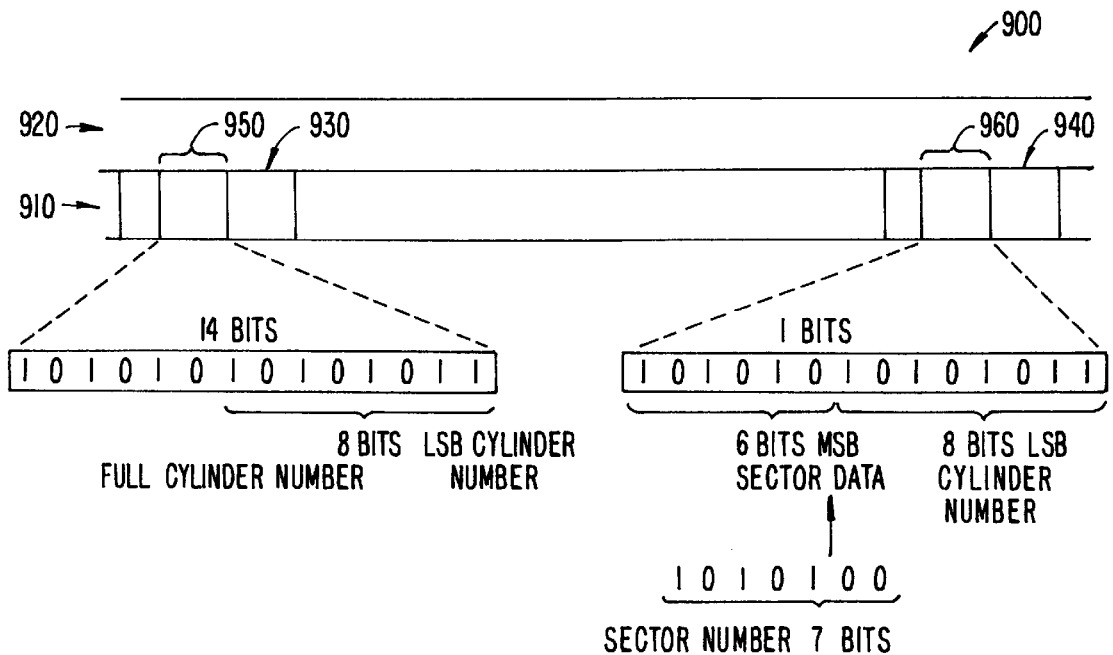
FIG. 7 illustrates an embodiment of the present invention.

FIG. 7 illustrates an embodiment of the present invention. FIG. 7 includes a close-up of a MR disk 900 having a track 910 and 920, track 910 includes a first servo burst 930 and a second servo burst 940.

As illustrated, first servo burst 930 includes a first set of data 950, and second servo burst 940 is embodied to contain a second set of data 960, both less than 24 bits wide, preferably 14 bits wide. In the preferred embodiment, both first set of data 950 and second set of data 960 are encoded with Gray code patterns.

In one embodiment of the invention first set of data 950 represents the full cylinder number of the disk, typically 14 bits. Further, second set of data 960 represents only a portion of the full cylinder number and sector data. In particular, second set of data 960 preferably includes only the lower 8 bits of the cylinder number. Further, second set of data 960 preferably represents the sector number, typically 6 bits, on track 910 bit shifted right by 1 digit (divided by two). Preferably, there are on the order of 9,100 cylinders, or track numbers on a typical disk. Further, there are typically 90 data sectors on each cylinder.

This pattern is preferably repeated for pairs of servo bursts. For example, first servo burst 930 may be an odd field and second servo burst 940 may be an even field, or vice versa.

Figure 8:
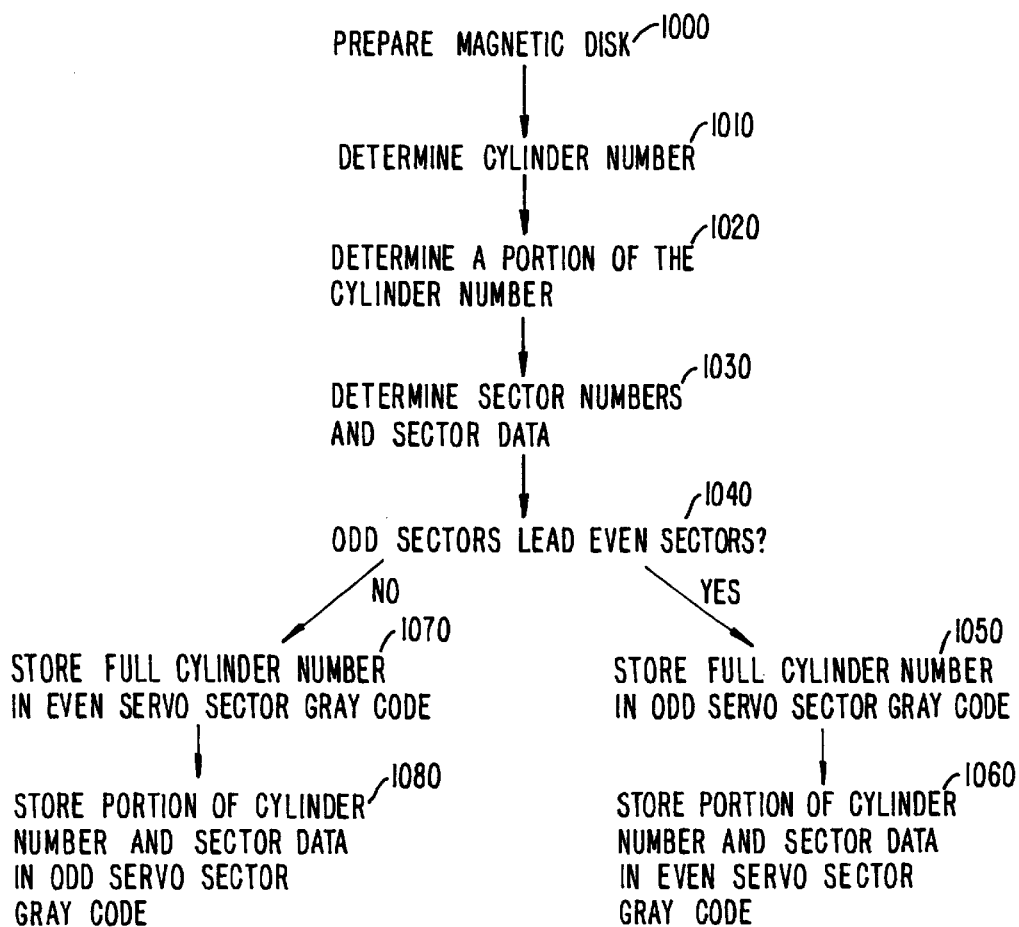
FIG. 8 illustrates a flow diagram of the present invention.

FIG. 8 illustrates a flow diagram of the present invention. In particular, FIG. 8 illustrates a method for formatting a magnetic disk with servo sectors.

Initially, the characteristics of a magnetic disk to be formatted with servo sectors is determined, step 1000. Next, the cylinder number of the magnetic disk is determined, step 1010, and a lower portion of the cylinder number is determined, step 1020. The sector data is then determined for each cylinder number, step 1030. Preferably, this step is accomplished by bit shifting the sector number to the right by one bit.

It is determined whether the even servo sectors will lead the odd, or vice versa, step 1040. If the odd servo sector leads, the cylinder number is stored in the odd servo sector, step 1050. Further, the lower portion of the cylinder number and the sector data is preferably stored in the immediately following even servo sector, step 1060. If the even servo sector leads, the cylinder number is stored in the even servo sector, step 1070. Further, the lower portion of the cylinder number and the sector data is preferably stored in the immediately following odd servo sector, step 1080.

In the preferred embodiment, the full cylinder number is identified by 14 bits, the lower portion of the full cylinder number is identified by 8 bits, the sector number is identified by 7 bits, and the sector data is identified by 6 bits. In alternative embodiments, a greater or lesser number of bits can be used, with different combinations, depending on the physical disk configurations used.

In alternative embodiments of the present invention, partition of cylinder data and sector data can be apportioned among more than two adjacent servo sectors. For example, a first portion of a cylinder number may be stored in a first servo field, a second portion of a cylinder number may be stored in a second servo field, and a third portion of a cylinder number and a sector number may be stored in a third servo field, where the first, second, and third portions of the cylinder number overlap.

Figure 9:
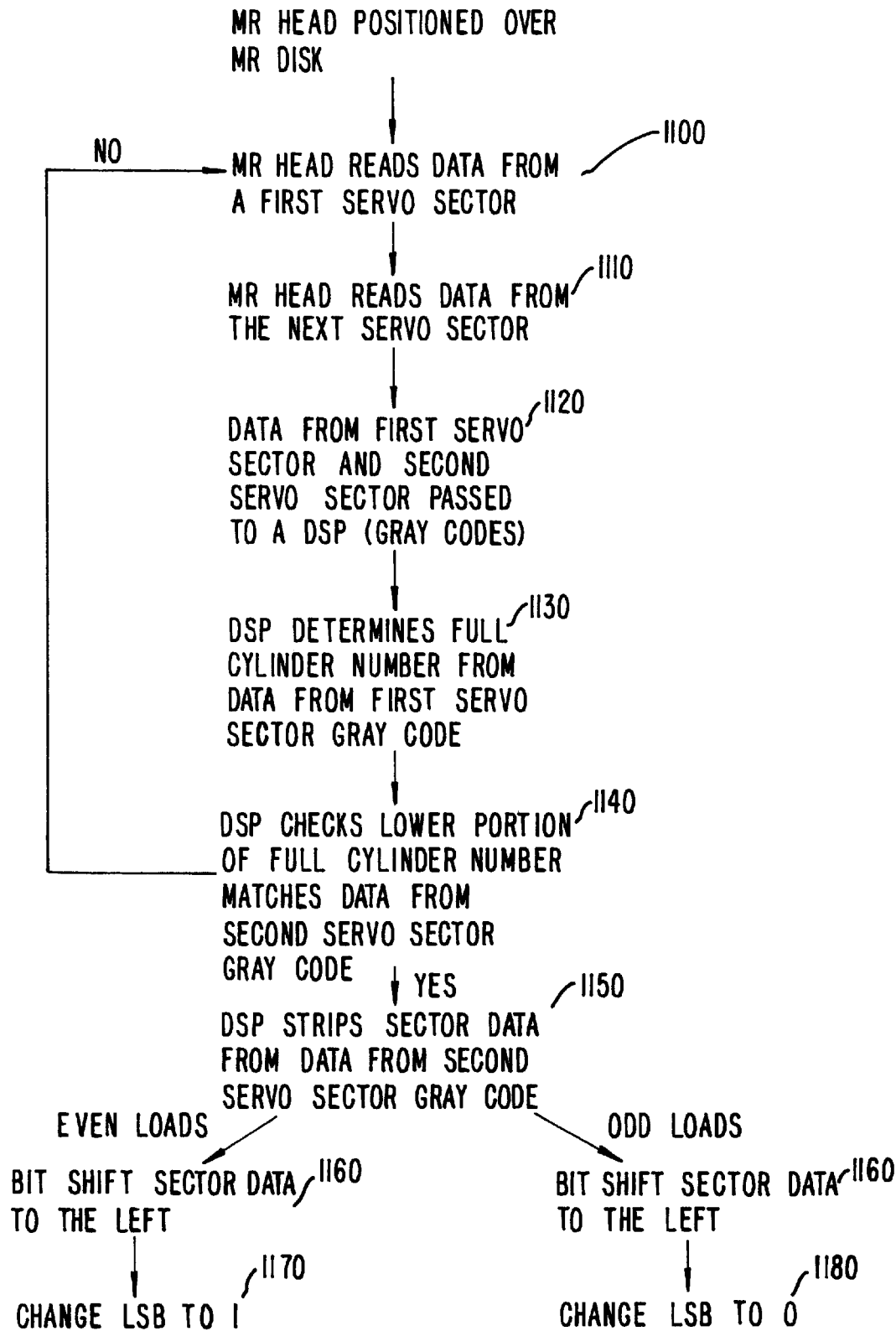
FIG. 9 illustrates a flow diagram of the present invention.

FIG. 9 illustrates a flow diagram of the present invention. In particular, FIG. 9 illustrates a method of locating a position of an MR head relative to a magnetic disk.

In normal operation, MR head 770, flies above the surface of MR disk 900. Initially first set of data 950 within a servo sector is read from MR disk 900, step 1100. Next, second set of data 960 is read from MR disk 900, step 1110. First set of data 950 and second set of data 960 are then passed to DSP 800, step 1120.

DSP 800 determines the cylinder number from first set of data 950, step 1130. Next, DSP 800 then checks to ensure that the lower portion of the cylinder number stored in second set of data 960 matches the lower portion of the cylinder number stored in first set of data 950, step 1140. If these data do not match, MR head 770 preferably reads in the next two servo sector data. If these data do match, DSP 800 strips the sector data from second set of data 960, step 1150.

Because it is known ahead of time (when MR disk is initially formatted) which type of sector (even or odd) contains first set of data 950 and which type contains second set of data 960, the least significant bit of the sector number can be predicted. When the odd field includes the lower portion and the sector data, the sector data bit shifted to the left one bit, step 1160 and the LSB is set to 1, step 1170. If the even field includes the lower portion and the sector data, the sector number is the sector data bit shifted to the left one bit, step 1160 and the LSB is set to 0, step 1180.

This embodiment is enhanced when the MR head can be accurately positioned at a specific cylinder number. In such an embodiment, a reference location, such as the ID or OD of the disk, is preferably first determined.

In alternative embodiments of the present invention, three adjacent servo sectors within a particular cylinder are read to determine the location of the MR head over the magnetic disk. In such an embodiment, the first and third servo sectors are compared, if they match that value represents the cylinder number and the upper portion of the second servo sector includes the sector data. Again, depending if odd leads even, the LSB sector number for the second servo sector is 0. If the first and third servo sectors are different, the second servo sector indicates the cylinder number, and the upper portion f the third servo sector includes the sector data. When even leads odd, the LSB of the sector number for the third servo sector is 1.

In embodiments of the present invention, an enhancement to the above embodiments is performed. In some cases, the MR head is positioned relative to servo sectors on the magnetic disk such that a first servo sector read is for a first cylinder, however, the second servo sector read is for a different cylinder. Such a case may occur when the unit is bumped, the magnetic disk is moved, etc.

For example, where the first servo sector is 2FFh, the lower portion of the next servo sector is 00M, the deduced cylinder number for the second servo sector should be 300h, not simply 200h. The MR head therefore was moved from cylinder number 2FFh to cylinder number 300h, not 2FFh to 200h.

Conclusion

In the foregoing specification, the invention has been described with reference to specific exemplary embodiments thereof. Many changes or modifications are readily envisioned.

The presently claimed inventions may also be applied to other areas of technology such as mass storage systems for storage of video data, audio data, textual data, program data, or any computer readable data in any reproducible format.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A method for determining a position of a read/write head relative to a magnetic disk, the method comprising:

providing the magnetic disk having a plurality of servo sectors;

reading a first gray code pattern in a first servo sector from the plurality of servo sectors on the magnetic disk with the read/write head, the first servo sector excluding a servo sector number;

reading a second gray code pattern in a second servo sector from the plurality of servo sectors on the magnetic disk with the read/write head, the first servo sector adjacent to the second servo sector on the magnetic disk, the second servo sector comprising at least a portion of a servo sector number associated with the second servo sector; and determining the position of the read/write head in response to both the first gray code pattern and the second gray code pattern.

2. The method of claim 1 wherein the first gray code pattern comprises cylinder data, and wherein the second gray code pattern consists of the portion of the servo sector number associated with the second servo sector and only a portion of the cylinder data.

3. The method of claim 2 wherein the portion of the cylinder data is a lower byte of the cylinder data.

4. The method of claim 2 wherein the portion of the servo sector number associated with the second servo sector comprises higher order bits of the servo sector number.

5. The method of claim 2 wherein the portion of the servo sector number associated with the second servo sector comprises the servo sector number associated with the second servo sector divided by two.

6. The method of claim 2 wherein the first gray code pattern is 14 bits wide.

7. The method of claim 6 wherein the second gray code pattern is 14 bits wide.

8. The method of claim 2 wherein determining the position comprises:

determining a cylinder number in response to the first gray code pattern; and determining the sector number associated with the second servo sector in response to the second gray code pattern.

9. The method of claim 8 wherein determining the servo sector number associated with the second servo sector comprises multiplying the portion of the servo sector number associated with the second servo sector by two.

10. The method of claim 1 further comprising:

reading a third gray code pattern in a third servo sector from the plurality of servo sectors on the magnetic disk, the third servo sector adjacent to the second servo sector on the magnetic disk; and comparing the first gray code pattern to the third gray code pattern, wherein determining the position comprises:

determining a cylinder number for the read/write head in response to the third gray code pattern when the first gray code pattern and the third gray code pattern are equal; and determining the cylinder number for the read/write head in response to the second gray code pattern when the first gray code pattern and the third gray code pattern are not equal.

11. A removable magnetic cartridge providing enhanced data storage capacity comprising:

a rigid casing; and a magnetic disk disposed within the rigid casing, comprising:

a top surface for storage of data; and a bottom surface for storage of data, the bottom surface comprising at least one logical cylinder, the logical cylinder including a plurality of data fields and a plurality of servo bursts, the plurality of servo bursts including a first servo burst including only a portion of a servo burst number for the first servo burst and only a portion of a cylinder number for the logical cylinder, and a second servo burst adjacent to the first servo burst, the second servo burst excluding a servo burst number for the second servo burst.

12. The removable magnetic cartridge of claim 11 wherein the first servo burst on the bottom surface of the magnetic disk includes the cylinder number for the logical cylinder.

13. The removable magnetic cartridge of claim 11 wherein the top surface of the magnetic disk comprises at least one logical cylinder, the logical cylinder including a plurality of data fields and a plurality of servo bursts, the plurality of servo bursts including first servo burst including only a portion of a servo burst number for the first servo burst and only a portion of a cylinder number for the logical cylinder, and a second servo burst adjacent to the first servo burst.

14. The removable magnetic cartridge of claim 13 wherein the second servo burst on the top surface of the magnetic disk includes the cylinder number for the logical cylinder.

15. A method for formatting a magnetic disk for a removable magnetic cartridge comprising:

providing the magnetic disk having a top surface and a bottom surface, the top surface having at least one cylinder having a cylinder number; and writing a plurality of servo bursts upon the top surface, the plurality of servo bursts including a first servo burst including a first gray code pattern and a second servo burst including a second gray code pattern, the first gray code pattern including at least a portion of a servo burst number and only a portion of a cylinder number for the first servo burst, and the second gray code pattern excluding a servo burst number for the second servo burst, the second servo burst adjacent to the first servo burst.

16. The method of claim 15 wherein the second gray code pattern comprises the cylinder number.

17. The method of claim 15 wherein the bottom surface includes at least one cylinder having a bottom cylinder number, the method further comprising:

writing a plurality of servo bursts upon the bottom surface, the plurality of servo bursts including a first servo burst including a first gray code pattern and a second servo burst including a second gray code pattern, first gray code pattern including only a portion of a servo burst number and only a portion of the bottom cylinder number for the first servo burst, and the second gray code pattern excluding a servo burst number for the second servo burst, the second servo burst adjacent to the first servo burst.

18. The method of claim 17 wherein the second gray code pattern on the bottom surface comprises the bottom cylinder number.

19. A computer system having a removable drive unit, the removable drive unit comprising:

a sensor for sensing a first gray code pattern and a second gray code pattern from a magnetic disk inserted into the removable drive unit, a memory coupled to the sensor for storing the first gray code pattern and the second gray code pattern, the first gray code pattern comprising only a portion of a data sector number and only a portion of a cylinder number, the second gray code pattern comprising only the cylinder number, the first gray code pattern and the second gray code pattern having the same number of bits; and a processor coupled to the sensor and to the memory for determining a position of the sensor relative to the magnetic disk in response to both the the cylinder number and the portion of the data sector number.

20. A computer system of claim 19 wherein the processor determines the data sector number in response to the portion of the data sector number.

* * * * *